SIGNAL TRANSLATING CIRCUIT

Filed July 24, 1961 5 Sheets-Sheet 1

INVENTOR.
FRED STERZER
BY
Eugene M. Whitacre
Attorney

Sept. 21, 1965 F. STERZER 3,207,991

SIGNAL TRANSLATING CIRCUIT

Filed July 24, 1961 5 Sheets-Sheet 2

INVENTOR.
FRED STERZER
BY
Eugene M. Whitacre
Attorney

INVENTOR.
FRED STERZER
BY Eugene M. Whitacre
Attorney

INVENTOR.
FRED STERZER
BY Eugene M. Whitacre
Attorney

SIGNAL TRANSLATING CIRCUIT

Filed July 24, 1961 5 Sheets-Sheet 5

INVENTOR.
FRED STERZER
BY Eugene M. Whitacre
Attorney

United States Patent Office 3,207,991
Patented Sept. 21, 1965

3,207,991
SIGNAL TRANSLATING CIRCUIT
Fred Sterzer, Princeton, N.J., assignor to Radio Corporation of America, a corporation of Delaware
Filed July 24, 1961, Ser. No. 126,086
15 Claims. (Cl. 325—449)

This invention relates to electrical signal wave translating circuits, and more particularly to modulator or frequency converter circuits using negative resistance devices.

Practically all existing UHF and microwave receivers make use of the superheterodyne principle wherein a received signal modulated carrier wave is converted to a corresponding, but lower frequency intermediate frequency wave. For frequencies above a few hundred megacycles, crystal diodes are almost universally used in the frequency converter circuits of these receivers.

Good UHF crystal mixers or converters have typically 3 to 4 db conversion loss and 5–6 db noise figure; at microwave frequencies the conversion loss and noise figure are somewhat higher. Ordinarily the crystal frequency converter is connected at the input of the receiver, and therefore, is the limiting factor on the noise figure of the receiving system. To improve the noise figure of such a receiver requires a low noise preamplifier preceding the crystal frequency converter, which at the frequencies in question comprises expensive, critical, and complicated circuits such as parametric, maser, or travelling wave tube circuits.

There is little likelihood that the noise figure of crystal mixers can be significantly improved by further research. Crystal diodes are passive devices, and therefore must have conversion loss, and their noise figure in turn must always equal or exceed the conversion loss. Recently, however, active microwave diodes such as tunnel diodes, with a negative resistance region, have become available. These diodes, whose unique properties depend on quantum mechanical tunnelling, exhibit active properties even at millimeter wave frequencies.

It has been heretofore recognized that frequency converters using negative resistance diodes can have arbitrarily large conversion gain as compared to the conversion loss associated with crystal diode converters. It has also been recognized that, due to the conversion gain, frequency converters using negative resistance diodes should have a better noise figure than similar circuits using crystal diodes. Thus, negative resistance diode converters offered a simple and economical way of improving the noise figure of high frequency signal receivers.

However, frequency converters using negative resistance diodes, such as tunnel diodes, were found to be critical to adjust and were subject to instability with variations in circuit parameters. For example, the amount of oscillator drive applied to the negative resistance diode had to be controlled so that the diode would not be driven hard enough to produce spurious oscillation. In addition, changes in the loading on the circuit caused by slight changes in the input circuit impedance and the like also caused instability resulting in spurious oscillation. As will be explained hereinafter, the limitations imposed on these circuits because of the stability problems limited the amount of noise improvement that was obtained over crystal diode frequency converter circuits.

Accordingly, it is an object of this invention to provide an improved wave-signal frequency changing system.

It is a further object of this invention to provide an improved frequency converter circuit employing negative resistance diodes, such as tunnel diodes, which provides extremely stable operation without excessive danger of spurious oscillation.

A still further object of this invention is to provide a low noise frequency converter using a negative resistance diode, such as a tunnel diode, which is stable with wide variations of input impedance.

A still further object of this invention is to provide an improved tunnel diode frequency converter having a lower noise figure than achieved in prior negative resistance diode frequency converters.

The equivalent circuit of a negative resistance diode, such as a tunnel diode, comprises a series circuit including the inductance "L" of the diode housing, the resistance "$r$" of the ohmic contact to the diode, and the parallel combination of the diode resistance "R" and diode capacitance "C" of the diode junction. It has been found that the selection of a diode satisfying the inequality $L<R_{min}^2C$, where $R_{min}$ is the minimum negative resistance of the diode, permits the construction of a frequency converter which exhibits excellent stability characteristics even in the presence of wide variations of input impedance or large oscillator voltage swings. It is recognized that the diode can be stabilized under certain conditions where "L" is slightly larger than $R_{min}^2C$, but it is believed that the limiting point where the diode can no longer be stabilized is where "L" is equal to or greater than $3R_{min}^2C$. In addition to the foregoing, the frequency converter circuit including the diode must satisfy the inequality $L_c+L<(r+r_c)R_{min}C$, where $L_c$ is the effective inductive contribution at a given frequency, and $r_c$ is the frequency converter circuit resistance. In the above noted inequalities, $R_{min}$, $r_c$ and $r$ are in ohms, $L_c$ and L are in henrys and C is in farads.

By selection of the D.-C. operating point for the diode in a positive resistance region adjacent the negative resistance region, and adjustment of the oscillator drive so that the diode is driven through substantially all of the negative resistance region, the circuit may be operated at a point where the conversion conductance is approximately equal to the average conductance of the circuit, and where the conversion conductance is large relative to the source or load conductances. Under these circumstances, the frequency converter will be substantially lossless, and the thermal and shot noise generated by the diode are substantially completely decoupled from the input and output circuits. Thus, the frequency converter of the invention provides a substantially lossless and noiseless frequency translation network for applying a received high frequency signal to a lower frequency low noise amplifier.

The novel features that are considered characteristic of this invention are set forth with particularity in the appended claims. The invention itself however, both as to its organization and method of operation as well as additional objects and advantages thereof will best be understood from the following description when read in connection with the accompanying drawings, in which:

Figures 5, 6:
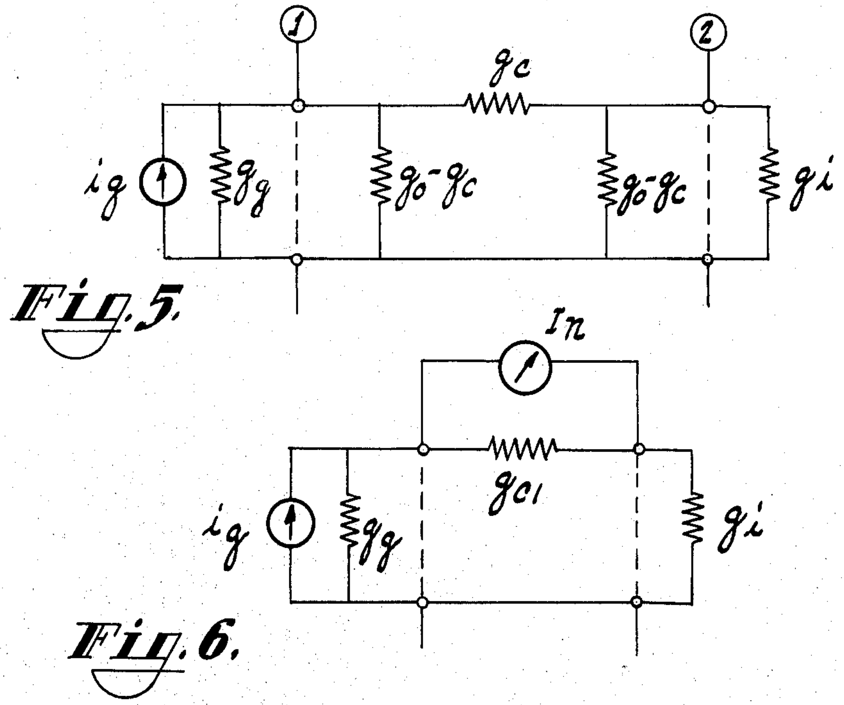
Figure 8:
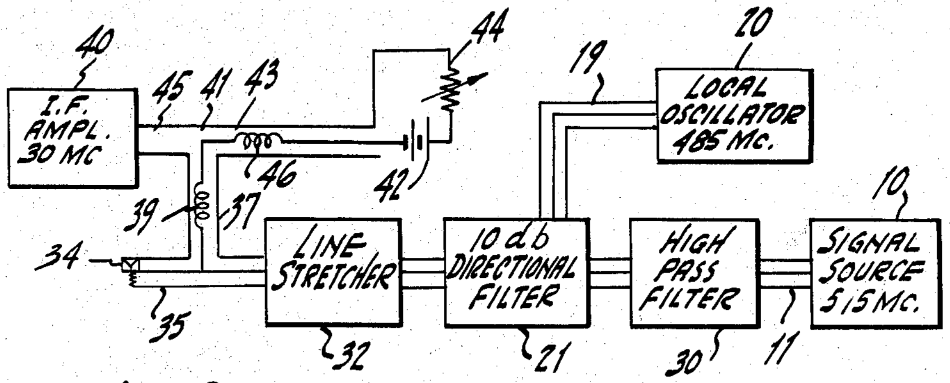
Figure 7:
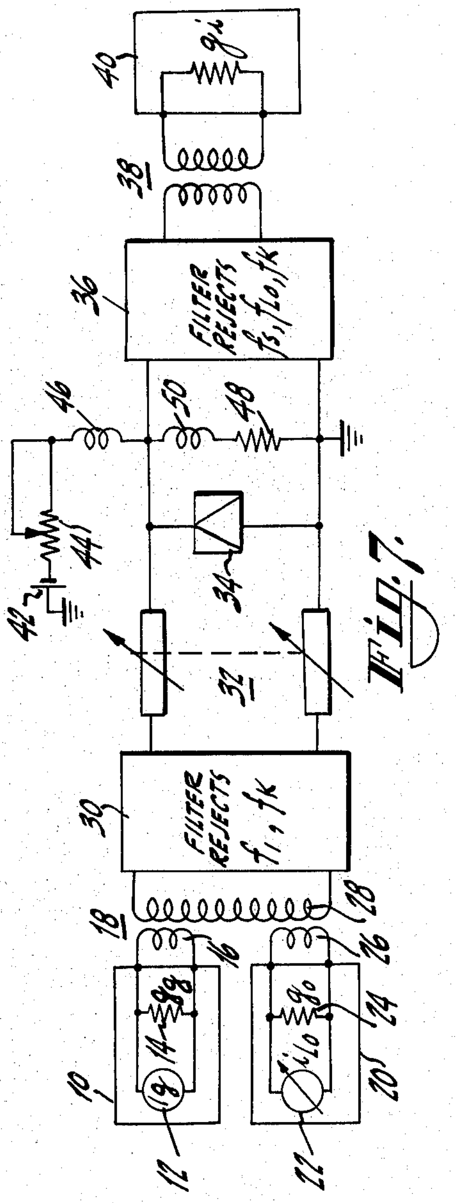
Figure 9:
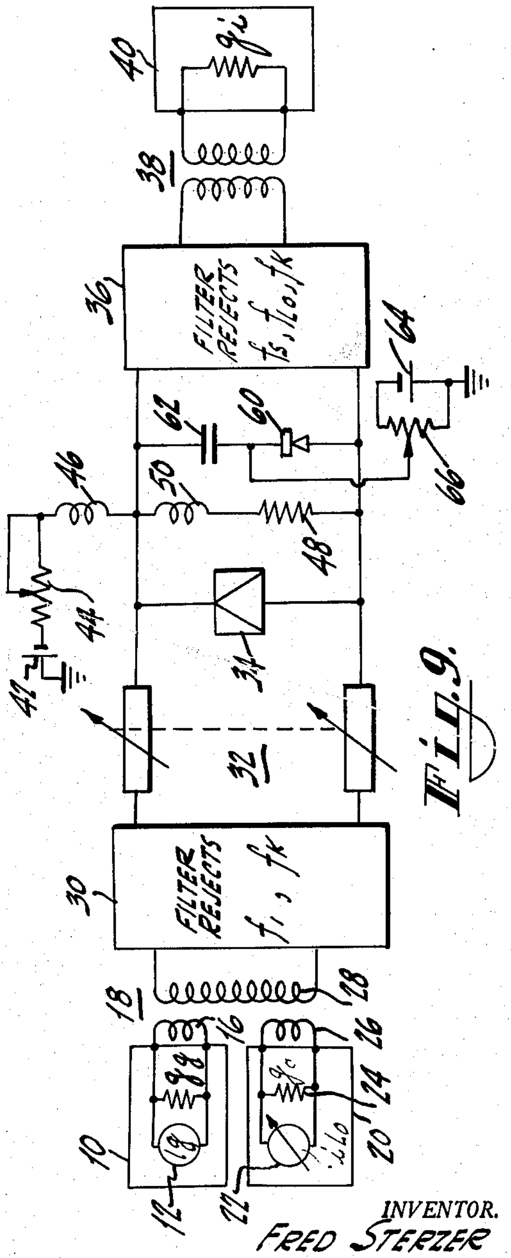

FIGURES 4*a*–4*d* are curves showing the relation between the average conductance, fundamental conversion conductance, and second harmonic conversion conductance of a tunnel diode frequency converter;

FIGURE 5 is a simplified equivalent circuit diagram of a non-linear conductance frequency converter with the image frequency signals short circuited;

FIGURE 6 is a simplified equivalent circuit diagram of a non-linear conductance frequency converter with the image frequency signals short circuited, and operated so that the average and conversion conductances are equal;

FIGURE 7 is a schematic circuit diagram of a frequency converter embodying the invention;

FIGURE 8 is a diagrammatic representation of the frequency converter shown in FIGURE 7; and FIGURE 9 is a schematic circuit diagram of a modification of the frequency converter shown in FIGURE 7.

One type of negative resistance diode which may be used in frequency converters embodying the invention is known as a tunnel diode. The constructural details of such diode are discussed in an article entitled, "Tunnel Diodes as High Frequency Devices," by H. S. Sommers, Jr., appearing in the Proc. IRE, p. 1201 et seq., July 1959.

Figure 1:
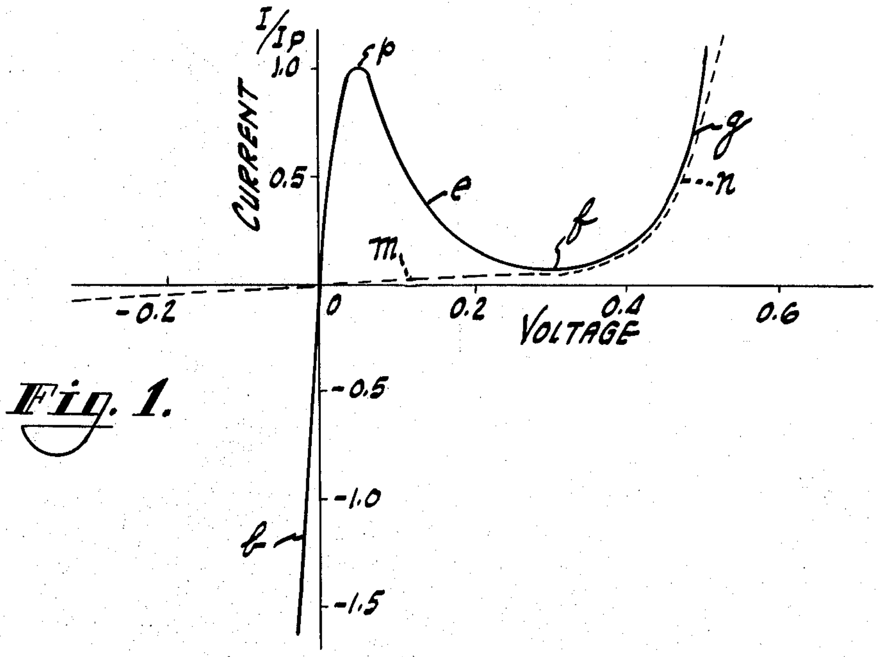
FIGURE 1 is a graph illustrating the current-voltage characteristic of a typical voltage-controlled negative resistance tunnel diode.

The current-voltage characteristic of a typical germanium tunnel diode is shown in FIGURE 1. The current scales depend on the area and doping of the junction, but representative currents are in the milliampere range. In the present case the current scales correspond to the ratio $I/I_p$ where I is the current through the diode for a given D.-C. bias voltage and $I_p$ is the current maximum point $p$.

For small forward bias voltages, the characteristic is substantially symmetrical (FIGURE 1, region $c$). According to present theory, the forward current results from quantum mechanical tunneling. At higher forward bias voltages, the forward current (believed due to quantum mechanical tunneling) reaches a maximum at (point $p$), and then begins to decrease. This drop continues (FIGURE 1, region $e$) to a current minimum point $f$, and eventually normal injection over the barrier becomes important and the characteristic turns into the usual forward behavior (region $g$, FIGURE 1).

Figure 2:
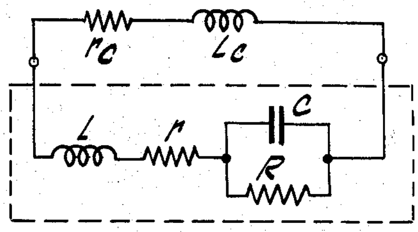
FIGURE 2 is an equivalent circuit diagram of a tunnel diode in a frequency converter circuit.

An approximate equivalent circuit of a tunnel diode is shown within the dotted rectangle of FIGURE 2 and comprises three elements connected in series; an inductance L, a resistance $r$, and a voltage dependent resistance R shunted by a voltage dependent capacitance C. The inductance L results mainly from the inductance of the diode housing; $r$ is the resistance of the ohmic contact of the diode, the base resistance of the diode, and the resistance of the internal leads of the diode package. C is the junction capacitance of the diode, and R is the resistance across the diode junction. A frequency converter circuit connected with the diode may be represented at any one frequency as an inductance $L_c$ and resistance $r_c$.

In a frequency converter, a signal of frequency $f_s$ and a local oscillator signal at frequency $f_o$ are impressed across a non-linear device. In general a complete set of sideband frequencies will be produced, so that all frequencies $f_{m,n}=mf_s+nf_o$ ($m$ and $n$ take on all positive and negative interval values and zero will be present). However, in most practical non-linear conductance converters, significant power flow takes place only at the signal frequency $f_s$, the local oscillator frequency $f_o$, the intermediate frequency $f_i$, and the image frequency $f_k$ ($f_k=2f_o-f_s$). In this case the non-linear conductance converter can be represented by a linear three port frequency translation network shown in FIGURE 3, provided that the amplitude of the sinusoidal local oscillator voltage across the non-linear resistance is much greater than the sum of the amplitudes of the voltage at signal, intermediate, and image frequencies.

Figure 3:
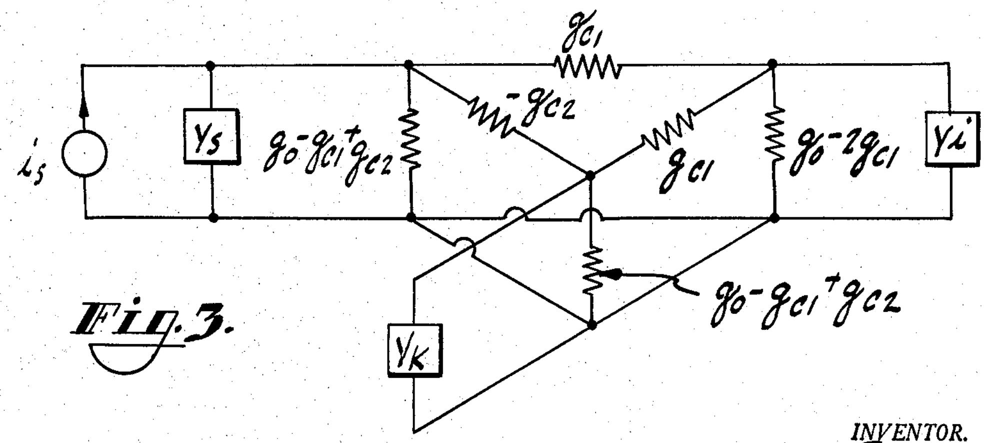
FIGURE 3 is a generalized equivalent circuit diagram of a non-linear conductance converter.

In FIGURE 3, $Y_s$ is the total admittance at the signal frequency connected across the non-linear conductance. Similarly $Y_k$ and $Y_i$ are respectively the total image and intermediate frequency admittances. $g_o$ is the average conductance of the non-linear conductance as driven by the sinusoidal local oscillator, $g_{c1}$ is the fundamental conversion conductance, and $g_{c2}$ is the second harmonic conversion conductance.

The coefficients $g_o$, $g_{c1}$ and $g_{c2}$ can be evaluated for a typical germanium tunnel diode by using a 10th order power series to approximate the current-voltage characteristics of the diode.

$$I=\sum_{n=0}^{10}\alpha_n V^n \qquad (1)$$

The conductance of the diode (from Equation 1) is given by $$G=\frac{dI}{dV}=\sum_{n=1}^{10}n\alpha_n V^{n-1} \qquad (2)$$

Upon application of D.-C. bias and local oscillator voltages Equation 2 becomes $$G=\sum_{n=1}^{10}n\alpha_n(V_B+V_0\cos w_ot)^{n-1}$$
$$=g_o+2g_{c1}\text{ co4 } w_ot+2g_{c2}\cos 2w_ot+\ldots\text{ etc.} \qquad (3)$$

($V_B$=D.-C. bias voltage, $V_o$=amplitude of the local oscillator voltage.)

$g_o$, $g_{c1}$ and $g_{c2}$, as evaluated from Equation 3 are plotted in FIGURES 4*a–d* as functions of $V_o$ for several values of $V_B$.

In practical positive non-linear conductance mixers it must always be true that:

$$G_o>O,\ g_o>|g_{c1}|,\ g_o>|g_{c2}| \qquad (4)$$

For a more complete understanding of these general principles, reference is made to an article by Herold, Bush and Ferris, entitled "Conversion Loss of Diode Mixers Having Image Frequency Impedance," Proc. IRE, pp. 603–609, September 1945.

FIGURES 4*a–d* show that these restrictions do not apply to tunnel diodes. As noted in FIGURES 4*a–d*, $g_{c1}$ exceeds $g_o$ over a certain range of local oscillator voltage amplitudes. The reason is that tunnel diodes exhibit a negative conductance over a portion of their current-voltage characteristics, as is shown in FIGURE 1. The fact the $g_{c1}$ can exceed $g_o$ enables a negative resistance diode frequency converter to exhibit a conversion gain.

It should be noted that the curves of FIGURES 4*a–d* assume a sinusoidal local oscillator voltage. In practice this is difficult to obtain because the tunnel diode tends to short, or clip the half of the oscillator voltage swing in the reverse direction. As a result, unless the oscillator comprises a constant voltage source, actual measured values for the curves 4*a–d* may differ somewhat from those of the drawings. The conductance values along the ordinate in FIGURES 4*a*–4*d* are normalized to the ratio $g_n/I_p$ where $g_n$ is the normalized conductance and $I_p$ is the current at the maximum point $p$.

Expressions for the conversion gain (i.e., the ratio of IF output power to the available signal power) can be derived from the equivalent circuit of FIGURE 3. If, for simplicity it is assumed that $Y_s$, $Y_k$ and $Y_i$ are pure conductances, so that $Y_s=g_g$ (=internal conductance of generator), $Y_k=g_k$, and $Y_i=g_i$ (=load conductance), then the conversion gain $G_c$ can be written as $$G_c=\frac{4g_ig_gM^2}{(g_g+g_{in})^2} \qquad (5)$$

where $$M=\frac{g_{c1}(g_o+g_k-g_{c2})}{(g_o+g_k)(g_o+g_i)-g_{c1}^2}$$

$$g_{in}=\frac{g_{c1}^2(2g_{c2}-2g_o-g_k)-(g_o+g_i)(g_{c2}^2-g_o^2-g_og_k)}{(g_o+g_k)(g_o+g_i)-g_{c1}^2}$$

Passive converters must have conversion loss as can be shown by inserting inequality (4) into Equation 5. Tunnel diode converters, on the other hand, may have conversion gain when any one of inequalities (4) is reversed.

Image rejection is frequently obtained by the use of suitable tuned circuits to short circuit the image frequency. In this case, the equivalent circuit of FIGURE 3 is considerably simplified, as shown in FIGURE 5, and the conversion gain can be written as $$G_c=\frac{4g_ig_gg_{c1}^2}{(g_o+g_i)^2(g_g+g_{in})^2} \qquad (6)$$

where $$g_{in}=\frac{g_o(g_o+g_i)-g_{c1}^2}{g_o+g_i}$$

The equivalent circuit of FIGURE 5 can be simplified further if the frequency converter has a short circuited image impedance, and the average conductance $g_o$ is equal to the conversion conductance $g_{c1}$. FIGURES 4*a*–4*d* show that the condition $g_o=g_c$ can be realized in tunnel diode frequency converters. The equivalent circuit of the converter then reduces to that shown in FIGURE 6, and the conversion gain is $$G_c=\frac{4g_gg_i}{\left(g_g+g_i+\frac{g_gg_i}{g_{c1}}\right)^2} \qquad (7)$$

As mentioned above, conversion gain is expressed as the ratio of IF power in the load to the available signal power.

The major advantages of a frequency converter embodying the present invention lies in its improved stability against spurious oscillation, and its improved noise performance. To best understand the significance of the contributions herein described, the circuits of this invention will be contrasted with tunnel diode frequency converters heretofore proposed.

In previous tunnel diode frequency converters, the diode was biased near the current maximum *p* or the current minimum *f* of the diode characteristic shown in FIGURE 1, to take advantage of the non-linearity of these regions. The local oscillator voltage applied to the diode was adjusted to drive the diode sufficiently into the negative resistance region to obtain conversion gain. Conversion gain may occur when the oscillator voltage causes the diode to operate in its negative resistance region for a sufficient time to overcome the losses introduced by the positive resistances of the circuit. Since the diodes of prior circuits were biased close to the current maximum or minimum points *p* and *f* respectively only a small oscillator voltage is required to obtain a condition providing conversion gain.

It was noticed that previous tunnel diode frequency converters tended to break into spurious oscillation, which rendered the circuit useless, if the oscillator voltage swing was allowed to drive the diode too far into the negative resistance region. The cause for this instability was not at all clear. Since prior converters were operated close to the point of instability, conversion gain could be obtained but changes in the loading on the frequency converter could easily cause spurious oscillations. As a practical matter, the input circuit of a converter is usually subject to wide changes in impedance, usually measured in terms of VSWR (voltage standing wave ratio). As a result, previous frequency converters required a considerable amount of adjustment with slight changes in operating conditions to prevent the circuit from breaking into spurious oscillation, often to the sacrifice of both gain and noise performance.

In accordance with the invention, it has been discovered that one of the requirements for a stable tunnel diode frequency converter is in the selection of a diode having certain characteristics. It was discovered that the diode should satisfy the inequality $L<3R_{min}^2C$, referring to FIGURE 2, Where "$R_{min}$" is the minimum negative resistance of the diode. One way of obtaining a diode satisfying this requirement is to reduce the "dot" or junction size. This effectively increases the "R" factor, but decreases the "C" factor such that the product RC remains substantially constant. However, since the "R" factor is squared in the inequality noted above $R^2C$ increases.

The combination of the diode and the circuit in which it is connected must also satisfy stability requirements. With reference to FIGURE 2, at a given frequency the circuit with which the diode is connected may be represented as an inductance $L_c$ and a resistance $r_c$. For stability, the composite circuit must satisfy the inequality $L+L_c<(r+r_c)R_{min}C$. An analysis of circuit considerations regarding stability in which the foregoing inequality is mathematically derived is "Tunnel Diode Microwave Oscillators," by Sterzer and Nelson, Proc. IRE, April 1961, pp. 744–753. If the inequality of $L+L_c<(r+r_c)RC$ is not satisfied, then a circuit may oscillate even if the diode satisfies the inequality of $L<3R_{min}^2C$. However, if the diode does not satisfy the last named inequality, then there is nothing further that can be done to stabilize the circuit.

Prior frequency converters were biased at a point where the R of the diode was quite large, and the circuit satisfied the inequality $L+L_c<(r+r_c)R_{min}C$. However, large excursions of oscillator voltage tended to drive the tunnel diode toward lower negative resistance portions of the diode characteristic. It is believed that the diode negative resistance eventually was low enough so that the inequality was not satisfied, and that this was one cause of the spurious oscillations that were produced. Furthermore, prior converter circuits included sufficient $L_c$ so that the circuit was close to instability, thereby permitting conversion gain. However small increases in $r_c$, which is a function of input circuit loading, tended to cause spurious oscillation when the converter circuit no longer satisfied the inequality $L+L_c<(r+r_c)R_{min}C$.

In addition to the selection of a diode and circuit satisfying the above stated conditions, it is recognized in accordance with the invention that conversion gain per se does not automatically provide the optimum overall noise figure for a receiving system. For example, in a given receiver having a low noise IF amplifier, a converter which has conversion gain but contributes a substantial amount of noise, would result in a worse noise figure than a low noise converter operating at unity gain. The application of this fundamental proposition means that the frequency converter circuit parameters can be selected for optimum noise performance with a conversion gain of unity, and not at a higher gain, e.g., close to the point of instability, without degrading the system noise figure.

In this regard, it should be noted that in general the minimum noise figure that can be obtained with amplifiers decreases with frequency. Thus a lossless frequency converter with unity gain, unlike an amplifier with similar properties, is of great practical importance. So long as the frequency converter does not introduce noise, or introduces a very small amount of noise, the frequency converter effectively appears as a (frequency converting) cable, and the overall system noise figure is effectively determined by a lower frequency low noise amplifier.

The system noise figure $F_s$ of a converter and IF amplifier combination such as shown in FIGURE 7 (assuming a high gain IF amplifier 40) can be written as $$F_s=F_1+\frac{F_2-1}{G_1} \qquad (8)$$

where $F_1$ and $G_1$ are, respectively, the noise figure and gain of the converter, and $F_2$ is the noise figure of the IF amplifier 40. The system noise figure, using the ideal converter providing substantially no noise and unity gain as described above, would therefore be simply the noise figure of the IF amplifier.

The noise figure of a frequency converter in accordance with the invention is lower than that of tunnel diode frequency converters known heretofore. The noise introduced by a tunnel diode is primarily due to shot noise and thermal noise and is represented in FIGURE 6 by a noise source $I_n$ in parallel with the conversion conductance $g_{c1}$.

In circuits according to the invention the effective noise source of the tunnel diode is decoupled from the input and output circuits. This is accomplished by operating the diode so that when the circuit is substantially lossless, such as at unity gain, the conversion conductance is large relative to either the input or output circuit conductance.

Referring to FIGURE 6, if the conversion conductance is very large compared to the source and load conductances $g_g$ and $g_l$ respectively, then the noise source, $I_n$ appearing across the conversion conductance $g_{c1}$ is substantially completely mismatched from the input and output circuits.

It will be noted from Equation 7 above, if the input and output impedances $g_g$ and $g_l$ are equal, the conversion gain $G_c$ approaches unity as the conversion conductance $g_{c1}$ becomes very large with respect to the input circuit conductance $g_g$. In this case the converter effectively appears as a lossless, noiseless four terminal frequency translation network.

Figure 4A:
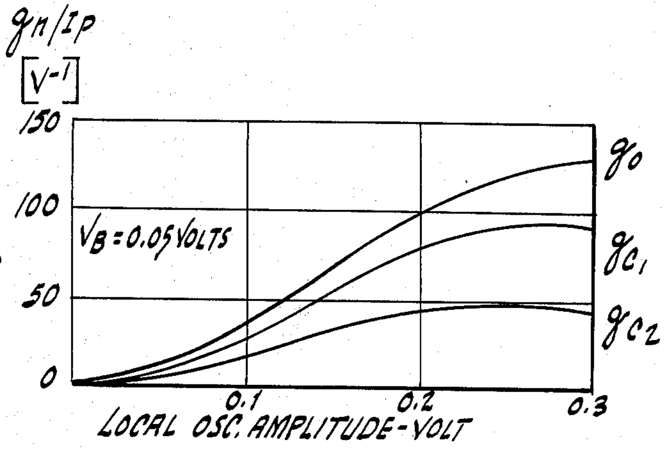
Figure 4B:
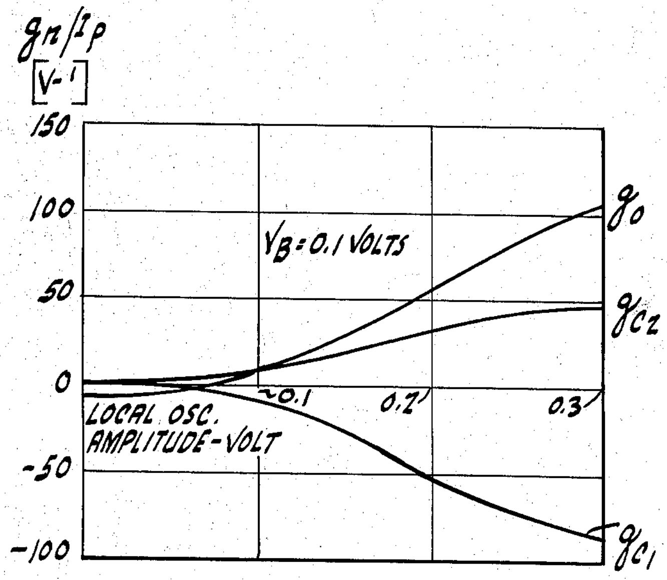
Figure 4C:
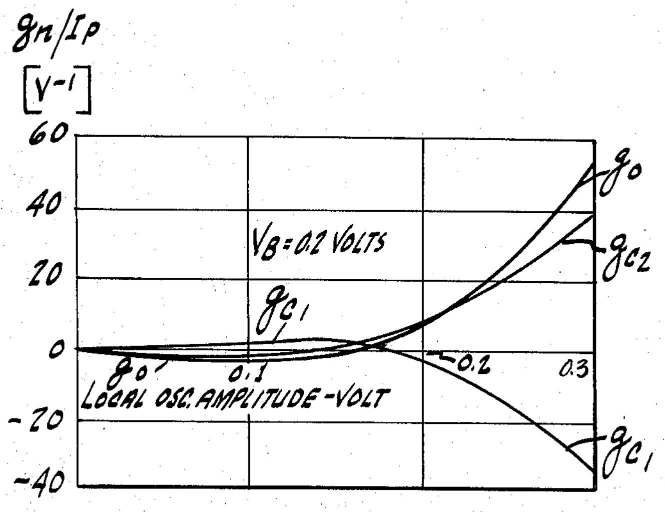

FIGURES 4*a–d* show that not all D.-C. bias voltages permit the optimum operation of a frequency converter. FIGURES 4*b* and 4*c* show that $g_{c1}$ exceeds $g_o$ for small oscillator voltage swings so that conversion gain can be achieved. However the conductance of $g_{c1}$ in this region is relatively low making the ratio of $g_g/g_{c1}$ relatively large. This is inconsistent with the decoupling of the thermal and shot noise sources of the diode from the input and output circuits, since the result is a noise contribution by the frequency converter.

Figure 4D:
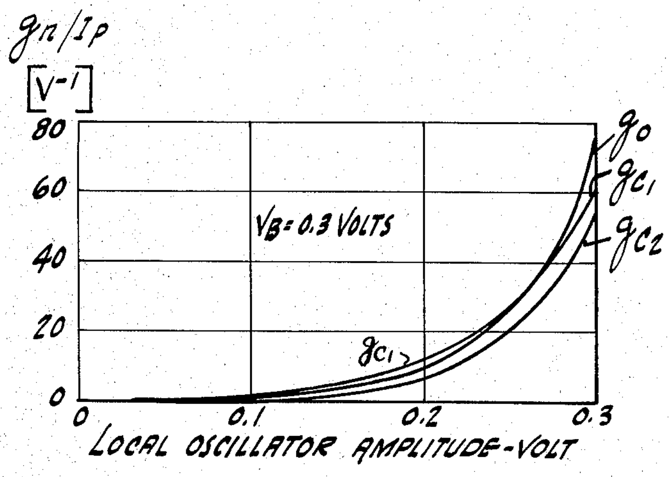

As shown in FIGURES 4*a* and 4*d*, the point at which $g_o$ equals $g_{c1}$ is at a point wherein $g_o$ and $g_{c1}$ are relatively large. Thus, the ratio of the input or output circuit conductances $g_g$ or $g_l$, respectively, to the conversion conductance $g_{c1}$ may be made quite large, thereby effectively decoupling the tunnel diode noise sources from the input and output circuits so that the frequency converter contributes very little noise and substantially no loss.

From the foregoing, it will be seen that the frequency converter input and output circuits are designed to provide given conductances which will be small relative to the conversion conductance $g_{c1}$. As a practical matter, it has been found that the optimum D.-C. bias voltage will depend on the particular characteristics of the diode which is used. In some cases the optimum bias point was found to exist between the origin and the point *p* of the curve of FIGURE 1. In other cases the optimum bias point was found to be in the region *g* of the curve of FIGURE 1. In either case the diode was driven sufficiently hard by the local oscillator voltage, i.e., the local oscillator voltage applied to the diode was sufficiently large, to provide a relatively high conversion conductance $g_{c1}$ which is about equal to the average conductance $g_o$.

In the foregoing discussion, it was mentioned that the conversion conductance was large with respect to either the input or output circuit conductances. This is to say that the conversion conductance is an order of magnitude or about ten times as large as the input or output circuit conductances. Under these conditions a circuit with matched input and output circuit conductances exhibits unity gain and very low noise contribution by the tunnel diode.

The circuit may be operated, in accordance with the invention, at a point where the conversion conductance is not an order of magnitude larger than either of the input or output circuit conductances. For example, the conversion conductance may be slightly larger than, or a few times larger than the input and output circuit conductances. Under these conditions the conversion conductance must be made larger than the average conductance if unity conversion gain is to be achieved. Thus the input and output circuits see a negative resistance, and the stability problems must be more carefully considered. In addition, the noise contribution of the tunnel diode becomes more significant. However, even under the last mentioned conditions, a frequency converter circuit can provide better stability and less noise than known tunnel diode frequency converters of the prior art.

Prior tunnel diode frequency converter circuits did not provide the noise performance of the frequency converter circuit of the invention. The reason for this is at least due in part to the restriction in the amount of oscillator voltage excursion that could be tolerated. A typical operating point for prior circuits would be provided by a D.-C. bias of about .05 volt. However, the maximum oscillator voltage swing which could be tolerated without instability was less than .1 volt.

From the curve of FIGURE 4*d*, it will be seen that for oscillator voltage swings of 0.2 volt or less, the normalized conductance $g_{c1}$ exceeds the average conductance $g_o$ but is quite low. This did not permit the diode noise sources to be completely decoupled from the input and output circuits, thus resulting in a poorer noise figure for the converter, than is achieved by the circuit of the invention.

A frequency converter embodying the invention is shown schematically in FIGURE 7, and diagrammatically in FIGURE 8. A source of signal modulated wave energy 10 shown as including a signal current source 12 and having a conductance 14 is coupled to a primary winding 16 of a transformer 18. In like manner a local oscillator 20 including an equivalent oscillator current source 22 and a conductance 24 is coupled to a second primary winding 26 of the transformer 18.

The transformer includes a secondary winding 28 which is coupled through a filter 30 and a line stretcher 32 to a tunnel diode 34. The filter 30 rejects signals at the intermediate frequency and at the image frequency $(2f_o-f_s)$, and the line stretcher 32 changes the effective length of the line coupled between the filter 30 and the diode 34 while maintaining the L to C ratio of the line constant. The line stretcher is adjusted to change the reactance at the diode as seen by signals at the image frequency for optimum converter operation.

The tunnel diode 34 is coupled to a second filter 36 which passes the intermediate frequency signals, but rejects signal, local oscillator and image frequencies. The intermediate frequency signals are applied through an output transformer 38 to an intermediate frequency load circuit 40.

The frequency converter circuit is shown diagrammatically in FIGURE 8. Parts shown in FIGURE 8 that correspond to like parts of FIGURE 7 are given the same reference numerals. In the diagram of FIGURE 8 signals from a suitable source 10 are coupled by way of a coaxial line 11 to a conventional high pass filter 30. The applied input signals may be assumed to be at a frequency of 575 megacycles, and the high pass filter has a cutoff frequency of 500 megacycles to block the image frequency (395 mc.) and the intermediate frequency from the signal source.

Signals from the local oscillator 20 at a frequency of 485 mc. are coupled through a coaxial cable 19 to a 10 db directional coupler 21. The effect of the directional coupler 21 is to direct most of the signal toward the line stretcher 32 and the tunnel diode 34. The line stretcher 32 is coupled to the directional coupler through a coaxial cable 33, and to the tunnel diode through a commercial "T" coaxial coupler 35. The leg 37 of the coaxial coupler includes an inductor 39 which corresponds to the filter 36 of FIGURE 7. The inductance value of the inductor 39 is such as to pass the 30 mc. IF, but to block signals at the signal frequency (585 mc.), image frequency (395 mc.) and local oscillator frequency (485 mc.).

A second coaxial "T" coupler 41 is coupled with the coupler 35. The center conductor of one leg 43 of the coupler 41 includes an inductor 46 which passes the D.-C. bias current, but blocks RF and IF. The other leg 45 of the coupler 41 is coupled to the 30 mc. IF amplifier 40.

The tunnel diode is biased to its operating point in a positive resistance region of its operating characteristic, preferably near the origin or past the current minimum *f* (of FIGURE 1), by a D.-C. supply source including a battery 42. The battery is connected in series with a variable resistor 44 and a choke 46 across the diode 34. A stabilizing resistor 48 whose lead inductance is represented by the inductor 50 is also connected across the diode 34. It has been found that some diodes exhibit the best noise performance when biased past the current minimum *f*. Other diodes were found to exhibit the best noise performance when biased close to the origin of the curve of FIGURE 1. In some cases, no D.-C. bias at all was required for good operating characteristics.

By adjusting the variable resistor 44, the voltage drop across the stabilizing resistor 48, and hence the tunnel diode 34 may be set to the desired D.-C. level. The choke 46 prevents the inductance of the power supply connections from reacting with the diode 34 to produce spurious oscillation.

The conditions for operation of the circuit of FIGURE 7 as an essentially noiseless, lossless converter are as follows:

(1) The diode should be biased in one of the positive resistance regions on either side of the negative resistance region *e* (FIGURE 1). As noted above, no D.-C. bias is needed in some cases.

(2) The applied local oscillator voltage should be at least 0.1 volt, i.e., the diode must be driven through essentially the entire negative resistance region to produce a relatively high conversion conductance.

(3) No spurious oscillation should occur at any point of the diode operating characteristic.

With respect to the first and second conditions, it will be noted from the graphs of FIGURES 4*a*–4*d* that an operating point near the origin or past the current minimum *f* permits the oscillator to drive the tunnel diode so that the conversion conductance of the diode can equal the average conductance thereof at a point where both of these conductances are relatively large. This enables the converter to achieve unity gain and low noise operation by maintaining a low value of the input or output circuit conductances compared to the conversion conductance as noted above. It will be noted in FIGURE 7 that the oscillator is diagrammatically shown to provide an adjustable oscillator voltage.

With respect to the third condition noted above, the inequality $L+L_c<(r+r_c)R_{min}C$ must be satisfied. With this condition satisfied the frequency converter is stable in operation and permits the necessary oscillator voltage swing to satisfy the second requirement noted above.

A modification of a tunnel diode frequency converter embodying the invention is shown in FIGURE 9. The circuit of FIGURE 9 is similar to that of FIGURE 7 except that a crystal diode 60, such as a point contact diode is connected across the tunnel diode 34. The diode 60 has its anode connected to the anode of the tunnel diode, and its cathode connected to the cathode of the tunnel diode 34 through a D.-C. blocking capacitor 62. The diode 60 receives a forward bias from a battery 64, through a variable resistor 66 which permits adjustment of the diode 60 operating point.

Assuming the point contact diode 60 to have an operating characteristic as illustrated by the dotted curve "M" of FIGURE 1, the bias voltage from the battery 64 is adjusted so that the operating point of the diode 60 is closer to the region "*n*" thereof than the tunnel diode 34 operating point is to the region *g*. Thus the composite characteristic of the tunnel diode 34 and the crystal diode 60 is one which is similar to that of the tunnel diode over a range of small voltages, but which has a steeper increase in current at a smaller voltage than that corresponding to the region *g* for the tunnel diode. The amount and polarity of bias, if any, applied to the crystal diode 60 will depend on its particular operating characteristics. The diode 60 may comprise a point contact germanium diode and the diode 34 a gallium arsenide tunnel diode. In such a case no bias is required for the diode 60.

The purpose of the forward biased crystal diode 60 is to further increase the conversion conductance of the frequency converter circuit. The higher conversion conductance $g_{c1}$ causes the ratio $g_g/g_{c1}$ of Equation 7 to more closely approach zero and thus to further improve the noise performance of the system.

In addition to converters of the type shown in FIGURE 7, broadband converters (no image rejection) embodying the invention have been built and operated with excellent results. These converters were stable with an input VSWR as high as 10–1 varied through all phases.

Although the circuits shown and described herein have been referred to as operating at unity gain, it is understood that positive conversion gain can be used providing the conditions for stability are satisfied.

What is claimed is:

1. A frequency converter comprising a negative resistance diode having a resistance *r*, an inductance L, a capacitance C and a minimum negative resistance $R_{min}$ satisfying the inequality $L<3R_{min}^2C$, local oscillator means coupled to said diode, and circuit means for applying an input wave of a first frequency to said diode and deriving an output wave of a second frequency from said diode, said circuit means having an effective inductance $L_c$ and an effective resistance $r_c$, the combination of said circuit means and said diode satisfying the inequality $$L+L_c<(r+r_c)R_{min}C$$

2. A frequency converter comprising: a signal input circuit; a local oscillator circuit; a signal output circuit; a negative resistance diode having a resistance *r*, an inductance L, a capacitance C and a minimum negative resistance $R_{min}$ satisfying the inequality $L<3R_{min}{}^2C$; and means coupling said negative resistance diode to said signal input circuit, said oscillator circuit and said signal output circuit, the composite of said signal input circuit, said local oscillator circuit and said signal output circuit having an effective inductance $L_c$ and an effective resistance $r_c$, the combination of said circuits with said diode satisfying the inequality $L+L_c<(r+r_c)R_{min}\ C$.

3. A frequency converter comprising in combination, a negative resistance diode having a current-voltage characteristic exhibiting both positive and negative resistance regions, a signal input circuit coupled to said diode, means providing a source of local oscillator voltage coupled to said diode, said local oscillator voltage being of a magnitude to drive said diode through substantially all of its negative resistance region, and an intermediate frequency signal output circuit coupled to said diode, the parameters of said negative resistance diode and of the circuits coupled thereto being such that the frequency converter is stable throughout that portion of the negative resistance region through which the diode is driven by said local oscillator voltage.

4. A frequency converter comprising in combination, a negative resistance device having a current-voltage characteristic exhibiting both positive and negative resistance regions, means providing a D.-C. bias source for biasing said diode in a positive resistance region, a signal input circuit coupled to said device, means providing a source of local oscillator voltage coupled to said device, said local oscillator voltage being of a magnitude to drive said device through substantially all of its negative resistance region, and an intermediate frequency signal output circuit coupled to said device, the parameters of said negative resistance diode and of the circuits coupled thereto being such that the frequency converter is stable throughout that portion of the negative resistance region through which the diode is driven by said local oscillator voltage.

5. A frequency converter comprising in combination, a negative resistance device having a current-voltage characteristic exhibiting both positive and negative resistance regions, means for biasing said device in a positive resistance region, a signal input circuit and an intermediate frequency signal output circuit having substantially equal impedances coupled to said device, and means providing a source of local oscillator voltage coupled to said device, said local oscillator voltage being of a magnitude to drive said device through a substantial portion of its negative resistance region to an extent where the conversion conductance is larger than the conductance of said input and output circuits.

6. A frequency converter comprising in combination, a negative resistance device having a current-voltage characteristic exhibiting both positive and negative resistance regions, means for biasing said device in a positive resistance regon, a signal input circuit coupled to said device, means providing a source of local oscillator voltage coupled to said device, said local oscillator voltage being of a magnitude to drive said device through a substantial portion of its negative resistance region to an extent where the average conductance of the device is approximately equal to the conversion conductance, and an intermediate frequency signal output circuit coupled to said device.

7. A frequency converter comprising in combination, a negative resistance diode having a current-voltage characteristic exhibiting both positive and negative resistance regions, said diode having a resistance $r$, an inductance L, a capacitance C and a minimum resistance $R_{min}$ satisfying the inequality $L<3R_{min}^2C$, means for biasing said diode in a positive resistance region, a signal input circuit coupled to said diode, means providing a source of local oscillator voltage coupled to said diode, the circuits coupled to said diode having an effective inductance $L_c$ and an effective resistance $r_c$, the combination of said diode and the circuits coupled thereto satisfying the inequality $L+L_c<(r+r_c)R_{min}C$, said local oscillator voltage being of a magnitude to drive said diode through a substantial portion of its negative resistance region, and an intermediate frequency signal output circuit coupled to said diode.

8. A frequency converter comprising in combination, a negative resistance diode having a current-voltage characteristic exhibiting both positive and negative resistance regions, said diode having a resistance $r$, an inductance L, a capacitance C and a minimum negative resistance $R_{min}$ satisfying the inequality $L<3R_{min}^2C$, a signal input circuit and an intermediate frequency signal output circuit having substantially equal impedances coupled to said diode, and means providing a source of local oscillator voltage coupled to said diode, the circuits coupled to said diode having an effective inductance $L_c$ and an effective resistance $r_c$, the combination of said diode and the circuits coupled thereto satisfying the inequality $$L+L_c<(r+r_c)R_{min}C$$

said local oscillator voltage being of a magnitude to drive said diode through a substantial portion of its negative resistance region to an extent where the conversion conductance is an order of magnitude larger than the conductance of said input or output circuits.

9. A frequency converter comprising in combination, a tunnel diode having a current-voltage characteristic exhibiting a pair of positive resistance regions joined by a negative resistance region, said diode having a resistance $r$, an inductance L, a capacitance C and a minimum negative resistance $R_{min}$ satisfying the inequality $L<3R_{min}^2C$, means providing a source of direct-current biasing voltage for biasing said diode in one of said positive resistance regions adajacent the negative resistance region, a signal input circuit and an intermediate frequency signal output circuit having predetermined conductances coupled to said diode, and a local oscillator coupled to said diode, the circuits coupled to said diode having an effective inductance $L_c$ and an effective resistance $r_c$, and the combination of said diode and the circuits coupled thereto satisfying the inequality $L+L_c<(r+r_c)R_{min}C$, said local oscillator providing a local oscillator voltage of a magnitude to drive said diode through a substantial portion of its negative resistance region to an extent where the average conductance and conversion conductance of said diode are of a magnitude with respect to said input and output circuit conductances to provide substantially unity conversion gain, and where the conversion conductance is an order of magnitude larger than the conductance of said input or output circuit conductances to effectively decouple the noise currents generated by said diode from said input and output circuits.

10. A frequency converter as defined in claim 9 including tuned circuit means, coupled to said diode for effectively short-circuiting the image frequency produced by the non-linear interaction of signals from said signal input circuit and said local oscillator.

11. A frequency converter comprising in combination, a tunnel diode having a current-voltage characteristic exhibiting a pair of positive resistance regions joined by a negative resistance region, means for biasing said diode in one of said positive resistance regions adjacent said negative resistance region, a signal input circuit and an intermediate frequency signal output circuit coupled to said diode, means providing a source of local oscillator voltage coupled to said device, said local oscillator voltage being of a magnitude to drive said device through a substantial portion of its negative resistance region, and means coupling a crystal diode in parallel with said tunnel diode to modify the current-voltage characteristic of said tunnel diode to the extent that one of said positive resistance regions is moved closer to said negative region to increase the conversion conductance of said frequency converter.

12. A frequency converter comprising in combination: a tunnel diode having a current-voltage characteristic exhibiting a pair of positive regions joined by a negative resistance region; means providing a source of direct current biasing voltage for biasing said diode in one of said positive resistance regions; a signal input circuit, a local oscillator and an intermediate frequency output circuit coupled to said diode; said diode and the circuits coupled thereto having an equivalent resistance $r$, and inductance L, a capacitance C and a minimum negative resistance $R_{min}$ satisfying the inequality $L<3R_{min}^2C$ for all operating points of said diode; the circuits coupled to said diode having an effective inductance $L_c$ and an effective resistance $r_c$, the combination of said diode and the circuits coupled thereto satisfying the inequality $$L+L_c<(r+r_c)R_{min}C$$

said local oscillator voltage being of a magnitude to drive said diode through a substantial portion of its negative resistance region so that the conversion conductance of said diode is substantially greater than the conductance of said input circuit or said output circuit.

13. A frequency converter comprising: a signal input circuit; a signal output circuit; a local oscillator circuit; a negative resistance diode having an inductance L, a capacitance C, a resistance $r$, and a minimum negative resistance $R_{min}$ satisfying the inequality $L<3R_{min}^2C$; and means coupling said negative resistance diode to said signal input circuit, said signal output circuit, and said oscillator circuit; the circuits coupled with said diode having an effective inductance $L_c$ and resistance $r_c$; said diode and the circuits coupled therewith satisfying the inequality $$L+L_c<(r+r_c)R_{min}C$$

14. A frequency converter comprising in combination: a negative resistance diode having a current-voltage characteristic exhibiting both positive and negative resistance regions, said diode having an inductance L, a capacitance C, a resistance $r$, and a minimum negative resistance $R_{min}$ satisfying the inequality $L<3R_{min}^2C$; a signal input circuit coupled to said diode; an intermediate frequency circuit coupled to said diode; means providing a source of local oscillator voltage coupled to said diode, said local oscillator voltage being of a magnitude to drive said diode through a substantial portion of its negative resistance region; the circuits coupled with said diode having an effectice inductance therewith $L_c$ and a resistance $r_c$, said diode and the circuits coupled therewith satisfying the inequality $L+L_c<(r+r_c)R_{min}C$.

15. A frequency converter comprising in combination: a tunnel diode having a current-voltage characteristic exhibiting a pair of positive resistance regions joined by a negative resistance region, said diode having an inductance L, a capacitance C, a resistance $r$, and a minimum negative resistance $R_{min}$ satisfying the inequality $L<3R_{min}^2C$; means providing a quiescent direct-current operating point for said diode in one of said positive resistance regions; a signal input circuit and an intermediate frequency signal output circuit having predetermined conductances coupled to said diode; the local oscillator coupled to said diode, said local oscillator providing a local oscillator voltage of a magnitude to drive said diode to a substantial portion of its negative resistance region to an extent where the average conductance and conversion conductance of said diode are of the magnitude with respect to said input and output circuit conductances to provide substantially unity conversion gain, and where the conversion conductance is large with respect to the conductance of said input or output circuit conductances to effectively decouple the noise currents generated by said diode from said input and output circuits; said signal input circuit, signal output circuit and local oscillator circuit having an effective inductance $L_c$ and an effective resistance $r_c$; said diode and the circuits coupled therewith satisfying the inequality $L+L_c<(r+r_c)R_{min}C$.

References Cited by the Examiner

Proc. I.R.E., May 1960, pages 854–858, "Low-Noise Tunnel-Diode Down Converter Having Conversion Gain," Chang et al.

Proc. I.R.E., December 1960, pages 2023–2024, "A Broad-Band Hybrid Coupled Tunnel Diode Down Converter," by Robertson, W. J.

Proc. I.R.E., January 1961, pages 350–351, "Experimental Tunnel Diode Mixer," Green et al.

DAVID G. REDINBAUGH, *Primary Examiner.*

ROY LAKE, *Examiner.*